UNITED STATES PATENT OFFICE.

GEORG FRIEDRICH ZACHER, OF HAMBURG, GERMANY.

PROCESS OF OBTAINING OXALIC ACID.

SPECIFICATION forming part of Letters Patent No. 587,777, dated August 10, 1897.

Application filed February 23, 1897. Serial No. 624,713. (No specimens.)

*To all whom it may concern:*

Be it known that I, GEORG FRIEDRICH ZACHER, a subject of the Emperor of Germany, and a resident of 27 Steindamm, Hamburg, German Empire, have invented a certain new and useful Improved Process of Producing Oxalic Acid, of which the following is a specification.

In the usual method of producing oxalic acid sawdust or other material containing cellulose is digested with caustic alkalies in an open vessel, stirred, and then, to complete the reaction, spread out on hot plates to be there oxidized by the air, which is freely admitted to it. This process is known to be very difficult and indirect, the result depending a great deal on the quickness and trustworthiness of the men in charge, as the formation of oxalic acid from cellulose is liable to marked variation, according to the temperature used—200° to 250° centigrade—and the thoroughness of the mixing. The oxidation above mentioned is also very unreliable. In close relationship with the formation of greater or smaller amounts of oxalic acid in the mixture there are also formed such substances as formic acid, acetates, phenol-like bodies, empyreumatic combinations of a most complicated kind, and the like. It is the formation of these combinations which the oxalic-acid manufacturers try to prevent as far as possible, because they impart a brown color, more or less deep, to the liquor and to the solutions formed therefrom for subsequent treatment, and their undesired presence has an exceedingly bad influence upon the crystallization of the alkaline oxalate, and, further, involves a whole series of subsequent tedious and costly processes necessary to obtain a commercially pure oxalic acid.

The above-mentioned substances, as well as the acetic and other combinations, are the direct cause of the formation of a quantity of greasy and amorphous products from the solutions in addition to properly-crystallized alkaline oxalates, which formation during the purification of the raw alkaline oxalate and the lyes resulting therefrom causes a considerable loss of oxalic acid. The finished mixtures must be dissolved in water. Then from these solutions the alkaline oxalate must be allowed to crystallize and separate from the mother-lye. These mother-lyes still contain, even after further concentration, considerable amounts of alkaline oxalate, which must be for the greater part lost, as the mother-lyes, which are heavily charged with the said substances, must be calcined for the purpose of destroying them. Thereby the oxalic acid, which is in solution, is naturally also burned, while the calcined mother-lyes produce potashes. The latter must be first dissolved again, treated with caustic, and then concentrated. Therefore a lot of work, money, and time have to be spent to get a caustic lye from the mother-lyes capable of being used in the arts, and a considerable amount of alkaline oxalate is lost at the same time. The alkaline oxalate obtained after separating the mother-lye is again dissolved in water and converted into calcium oxalate and alkali by means of milk of lime. The alkaline lyes then separated are again treated as above described. The calcium oxalate is decomposed by sulfuric acid, and the resultant hydrated oxalic acid is evaporated to crystallization in the usual manner.

All these disadvantages and difficulties it is the object of the present invention to obviate, the entire digesting operation being carried out *in vacuo* in order to get a clear or uncolored liquor and to prevent the formation of the above-mentioned substances. Furthermore, the vacuum permits of the use of the low temperature with its consequent economy of fuel. Cellulose (sawdust) is used, preferably, for forming the mixture to be digested, such cellulose having been previously desiccated and deprived of its accompanying air *in vacuo* in a comparatively warm vessel, which vessel afterward serves to receive the mixture for digestion. The result is that after the desiccation of the cellulose the hot concentrated alkaline lye which has been sucked into the vessel by the vacuum is readily absorbed by the sawdust, which is free from air and dry, and that this absorption and the reaction of the lye upon the cellulose, which contains no cold air, takes place without any fall of temperature and without forming a scum and without the results of a free access of atmospheric oxygen to the mixture.

For carrying the invention into effect a vessel which possesses a steam-jacket is preferably used. This vessel is in connection with a condenser or an air-pump, and, according to the circumstances, is heated by steam or cooled by water. Into this comparatively hot vessel first the sawdust or other cellulose-containing material for one digestion is introduced, and the vessel, having been closed, is exhausted during the stirring operation and a gradual elevation of the temperature to about 70° to drive the air and water out of the sawdust. Hereupon the alkali lye, which has been previously brought to a certain temperature and strength, is sucked into the vessel by the vacuum, the stirring operation being maintained. The vacuum is kept as constant as possible during the subsequent operation, and the said temperature of 70° is brought at length to, at most, 180° centigrade, according to the progress of the digestion, which progress is controlled by testing samples. Near the end of the digestion an oxygenating substance—such as hydrogen peroxid, sodium peroxide, or the like—can be introduced, or atmospheric air which has been enriched in a known manner with oxygen is sucked into the apparatus, the latter still *in vacuo*. The entire digesting operation is finished in a few hours and is throughout even and safe.

Such a process of digestion being prepared *in vacuo* and at a temperature below 180° centigrade is distinguished from other methods particularly in respect of the following points: that it contains hardly any of the before-mentioned substances which color the liquor, that the amount of alkaline carbonate is much smaller, and that it contains a much higher percentage of oxalic acid than other digestion conducted in an open vessel and without a vacuum, as the conversion of the cellulose-containing raw material is a more complete one, such material being nearly all converted into oxalic acid. Besides the important direct advantage of the greater yield of oxalic acid, the new process allows an important shortening and simplification of the following procedures: The finished hot liquid is dissolved in water in the vessel which has been used for its production. This solution is forced into an open stirring-cylinder and thinned there, whereupon by adding the necessary amount of lime the conversion of all the oxalic acid which is to be found in the liquid into a nearly white very pure calcium oxalate takes place directly. Thus the many tedious and expensive operations formerly necessary for producing an alkaline oxalate as pure as possible, upon which operations the success of the entire process depends, are obviated. The calcium oxalate produced by this method, and which, in consequence of the minimum presence of alkaline carbonate in digested mass, contains no calcium carbonate worth mentioning, is separated from the lime in any known manner by filtration and is decomposed by means of sulfuric acid, and as the result of the purity of the calcium oxalate a good white oxalic acid is produced by this improved process with only one crystallization. The alkaline lyes which are filtered from the calcium oxalate can be immediately used again for a new digestion. Thus the whole difficult and expensive operation of calcining and treating with caustic is obviated.

Having now described my invention, what I claim as new, and desire to secure by Letters Patent, is—

A process for reducing oxalic acid from raw material containing cellulose, consisting in digesting them in an alkaline lye *in vacuo* and in a low temperature, the said raw material having been, preferably, previously desiccated and deprived of the air accompanying it.

In witness whereof I have hereunto set my hand in presence of two witnesses.

GEORG FRIEDRICH ZACHER.

Witnesses:
ALFRED WILKEN,
E. D. H. MUMMENHOFF.